US00RE36209E

United States Patent [19]

Walls

[11] E Patent Number: Re. 36,209

[45] Reissued Date of Patent: May 11, 1999

[54] DOOR LOCK APPARATUS

[76] Inventor: Donald L. Walls, 2913 S. Pasadena St., Indianapolis, Ind. 46256

[21] Appl. No.: 08/816,964

[22] Filed: Mar. 24, 1997

Related U.S. Patent Documents

Reissue of:

[64] Patent No.: 5,403,047
Issued: Apr. 4, 1995
Appl. No.: 08/002,719
Filed: Jan. 11, 1993

[51] Int. Cl.[6] ..... E05C 1/12

[52] U.S. Cl. ..... 292/173; 292/336.3

[58] Field of Search ..... 292/173, 92, 336.3, 292/153, DIG. 65, 169.17, 165; 70/111, 489, 484, 485, 467, 471, 468, DIG. 27

[56] References Cited

U.S. PATENT DOCUMENTS

| | | | |
|---|---|---|---|
| 1,236,979 | 8/1917 | Porter | 70/468 |
| 1,544,575 | 7/1925 | Halper | 292/165 |
| 2,179,430 | 11/1939 | Schmitt | 292/173 |
| 2,459,354 | 1/1949 | Anderson | 292/163 |
| 2,521,111 | 9/1950 | Ylinen | 70/489 |
| 2,784,993 | 3/1957 | Collar | 70/489 X |
| 3,064,462 | 11/1962 | Ng et al. | 70/153 |
| 4,003,593 | 1/1977 | Wilzig et al. . | |
| 4,438,963 | 3/1984 | Friedrich | 292/153 |
| 4,575,137 | 3/1986 | Jans | 292/169.14 |
| 4,629,228 | 12/1986 | Marko et al. . | |
| 4,838,053 | 6/1989 | Shen | 292/92 X |
| 4,986,583 | 1/1991 | Campbell et al. . | |
| 5,074,602 | 12/1991 | Hwang | 292/173 |
| 5,085,474 | 2/1992 | Toledo et al. | 292/92 |
| 5,460,419 | 10/1995 | Castoldi . | |
| 5,609,372 | 3/1997 | Ponelle . | |
| 5,624,141 | 4/1997 | Kuo et al. | 292/165 |
| 5,666,830 | 9/1997 | Litvin | 70/129 |

*Primary Examiner*—Darnell M. Boucher
*Attorney, Agent, or Firm*—Locke Reynolds

[57] ABSTRACT

A locking apparatus, particularly desirable for modifying a "push/pull" latch apparatus for a hospital door, by which it may be released from a locked condition by manual effort applied from either side of the door, thus giving an unlocking effect to a door even though its locking has been caused by a manual locking effort applied by the person on the other side of the door.

The apparatus has a particularly beneficial use in a large commercial installation such as a hospital, and provides that the lock-releasability may be achieved by a manual effort applied wholly on the outside of the door, as well as the person on the inside of the door being able to either lock or unlock the door; and, although the door may be locked or unlocked from either side, the unlocking component manually operable to lock or unlock the door from the outside is provided to be of such an inconspicuous nature that it would be realistically considered to not be a component with a door-unlocking effect.

Thus the door may have the advantage of granting privacy to a person on the inside of the room, even though during an emergency a nurse or other authorized person would be able to achieve a locking-release effect of the door.

19 Claims, 9 Drawing Sheets

DOOR LOCK APPARATUS

Matter enclosed in heavy brackets [ ] appears in the original patent but forms no part of this reissue specification; matter printed in italics indicates the additions made by reissue.

I. FIELD OF THE INVENTION

This invention relates to mechanisms for controlling the status of doors, i.e., the doors' condition as being open, latched or locked, and more particularly to such mechanisms which are of the so-called "push/pull" type, i.e., a door-control mechanism which requires a push or a pull effort by the user to achieve a change in the door's condition, i.e., to or from a latched or open door-condition, in contrast to "twist" type door-change mechanism requiring the door-condition change-effort of the user to be that of a rotations effort generally along an axis perpendicular to the face of the door.

More particularly, the present invention relates to the so called "push/pull" type of door hardware of the push/pull type of door-control mechanisms which, for door-change operativity, have a manually pressable or pullable lever on both faces or sides of the door, with the mechanism on the inner face of the door being operable at the user's control from inside the room to latch the door, and to unlatch the door, and similarly a mechanism on the outside of the door for latching and unlatching the door.

The field of the invention is further narrowed by the prior art limiting itself to the provision of a locking mechanism operable from inside the door, for use in a situation in which, e.g., the door is the door of a restroom, and the user wishes to lock the door as to assure himself of privacy for as long as he desires to stay in the room; and from the user's standpoint he would like his privacy to be 100% against not only a blundering intruder but 100% also against even the most well-intentioned other person opening the door for any reason.

II. THE VERY PARTICULAR PROBLEM HERE SOLVED BY THE PRESENT INVENTION

The problem which the door mechanism field has not solved, in giving the push/pull door control assemblies the goal sought by the user of the restroom (or whatever else is a similar situation), is that the 100% privacy, which the user desires, can correspondingly be a 100% mishap or even tragedy if the privacy-desiring person inside is usable or unwilling for any reason to unlock the door, creating a "locked-in" emergency or possible disaster because neither a helper outside nor the user in the room can get the door to be opened. But unless the door can be opened, the patient is trapped.

Thus, because of the "locked in" danger (no matter as to how it has or would likely happen), the foreseeable dangerous trap has compelled the use of a lock separate from the push/pull hardware, to achieve any locking ability which would give advantageous unlocking from the outside, as provided by the present invention.

Various means for overcoming this locked-in problem have a definite disadvantage in comparison to the present invention, which succeeds by providing the concept of a sort of "mutual over-riding" or blocking mechanism which at least in effect is integrated with the push/pull mechanism which achieved the latching itself, and is often (as here) difficult to visually distinguish from a push/pull door mechanism which has no feature of lock-releasability from the outside.

According to this inventor's knowledge, the prior art has used push/pull latch mechanisms only for their "latch" purpose; that is, it has used push/pull mechanisms only as a "passage permitter," meaning that the door can be unlatched from either side, and, if a locking feature is desired, such a locking feature would have to be provided with a locking device apart from the push/pull mechanism, such as in U.S. Pat. No. 3,897,092, granted in 1975 to Norman C. Atkins.

The citation of prior art made by the Patent Office during the examination of the present invention was the patent to R. Shen, U.S. Pat. No. 4,838,053; however, the Shen device was a lever-twist apparatus using using two bolt-and-striker sets, with a separate deadbolt, and the Shen patent did not suggest or explain how lock-control from the outside could be achieved with the present invention's capability of lock-control from the outside, in a push-pull device, having only a single bolt-and-striker set.

Departing from those patents by advantageous and significant locking and unlocking concepts, novel in push/pull door-controls, the present invention's concepts provide the meritorious achievement of what may be considered 100% safety rather than 100% trapped disaster.

Also a "Trimco" device, U.S. Pat. No. 4,003,593 (Wilzig 1977) is a blocking device, activated by undue heat; when the heat of a room reaches a certain temperature there would be a release of a spring, with a plunger device set onto the handle. The object of that device is to keep doors closed during a fire; and it does not provide the emergency safety operativity of the present invention, nor show or suggest the present invention's construction or operativity concepts.

Such mechanisms illustrate the incompleteness of the prior art, an incompleteness of them providing a locked-in privacy, but not achieving the fuller goal of emergency exit unlockability from the outside face of the door. That is, the prior art of these patents cited, and all other prior art which they represent, fail to have or to show the vitally needed, and perhaps life saving, combination of handle-blocking and related concepts of the invention set forth herein, which utilizes a push/pull type latch device as a lock releasable from the outside of the door, especially in an installation in which the device components on both sides of the door appear to be about the same, to casual observance by a person who is unauthorized and thus not knowledgable of the fact that latch-release is achievable from the outside of the door by (but only by) a release mechanism whose actuator, although externally carried, is quite inconspicuous in the realistic sense of not suggesting that type of operativity.

III. MORE PARTICULARS OF THE PRIOR ART, AS SHOWING THE NOVELTY

In addition to the specific documentation mentioned as to doors above, as specific prior art of this field, it is conceded that the prior art has had passage type push/pull latches control long before the present invention; i.e., the prior art has long had passage type push/pull latches that would retract a latch-bolt by the user pushing or pulling on a handle which had latch-releasing linkage for both sides of the door.

But the prior art has long had a problem when trying, e.g., to use the push/pull latch on a restroom door; for to give the restroom person his desired 100% privacy assurance, he had to be provided with a locking means as criticized herein. I.e., such a lock could be used to lock the door, but with that prior art apparatus a key must at all times be available if a patient or person inside the bathroom could not unlock the deadbolt lock.

Also, the use of a deadbolt lock, as an addition to the push/pull latch mechanism of the prior art, would increase the cost for a dual locking system, beth as to installation and repair thereof, duplicate keys, etc.

The biggest advantage of all push/pull latch type of door-controls prior to the present invention, and indeed push/pull latch mechanisms do provide a great advantage, is as to their operativity, i.e., by pushing or pulling which can be done by use of only one arm, leaving the other arm free to carry a tray or help a patient with both hands.

But all the prior art prior to the present invention has stopped short of inventing a practical way of providing lockability from inside the door, in a combination which also provides releasability from outside the door, in a push/pull door-control installation; but without the outside lock releasability, the full benefits of the push/pull advantages cannot be attained both safely and economically.

IV. PRIOR ART AS OF THE FIELD OF LOCKS AND OF SOMEWHAT RELATED FIELDS, COMPARED TO THE PRESENT INVENTION

In considering the nature of the "outside releasability" of push/pull lock concepts and contrasting the inventive nature of the present concepts over prior art push/pull door controls as known to the inventor, it is not only to be conceded but emphasized that there are probably already many thousands, perhaps millions of push/pull door mechanisms now installed in the prior art door latches; but without releasability from the outside, the locked setting of a push/pull latch device creates an entrapment, possibly fatal.

However, such door latches of the prior art, including any of current use known to the inventor, all have disadvantages nicely avoided by the present invention. That is, even though providing some push/pull benefits, the prior art devices do not provide embodiments safely having lockability from either side with an over-riding function of a lock-releasability from the outside, regardless of how the latched condition was established in their push/pull apparatus; the prior art does not provide means for a latch-bolt to become a lock-bolt by having a component of the latch linkage to be movable to provide a lock-establishing abutment condition of the handle, in a combination which is actuatable from outside the door and provides opposite movability of that component which releases the lock-bolt by removing the lock-establishing abutment condition of the handle.

This is the special benefit of the present invention, as a culmination of the concepts upon which the present invention builds by utilizing the push/pull developments of door-control now here by establishing a lock, releasable from the outside.

In the hindsight consideration of the present invention to determine its inventive and novel nature, it is not only conceded but emphasized that the prior art had details usable for and/or in this invention, but only if the prior art had had the guidance of the present concepts.

That is, it is emphasized that the prior art has long had several particulars of door hardware whose inventive developments in this field have stopped short of the present invention, not only from specifically the prior art of commercial door-latch controls but to prior art in fields which might be considered as analogous to this push/pull latch field. For example:

a. The prior art had doors, locks of various kinds, push/pull latch devices, door knobs which have effectively secured doors and assisted in opening and/or unlatching doors, and even given the security or privacy against an intrusion;

b. The prior art has long known of the disadvantageous nature of doors not providing a lock, and the tendency of non-locked doors to be open without regard to a person inside the room desiring privacy;

c. The prior art has long known of the use of the latch-release device being used by hospitals, nursing homes, etc.;

d. The prior art has provided a lock, such as a deadbolt lock, to be attached separately from any type of latch-releasing devices, but considered to be not directly useful with a latch-control because a latch-control device with a separate deadbolt had been considered to not be safe unless there is provided a release operativity controlled from the outside of the door;

e. Latch devices for doors have been used and understood by many and perhaps most persons in the field of manufacturing door-controls, and knowledge of the workability, and operativity of latch devices is not limited to persons of high technology or inventive skill; and indeed it is with such conventional components and knowledge of the prior art that the concepts of this invention are advantageously provided, as a lock-desired feature of the door-control operativity by the extra provision of the control and ability of the release of door-locking from the outside of the door;

f. Surely the hospital and/or medical industry have long realized the non-privacy-disadvantages of the non-lockable rooms of a hospital to not provide the .desired privacy for the patients and/or their visitors, who would otherwise feel more comfortable either physically or emotionally, with a privacy lock with a fully operable nature; however these industries also realize the expense of attaching a deadbolt lock separately from any latch device to provide privacy for the patients;

g. This field's prior art, presumably, has always known that it would be much more convenient and economical to not have to waste by having to provide a special key to every authorized member of the hospital staff in order to be assured that a particular nurse most accessible to the locked-in patient will not have to have a special key to gain entrance to the locked room; and correspondingly, all of the prior art would surely know that the cost of keys would be exceedingly a waste of money and effort even if a separate key-code would be available for each of the possibly hundreds of rooms to be made a part of a key system;

h. Even the "control from the outside" twist-type controls with the identical trapped-avoiding purpose, as shown herein as the purpose of the push/pull hardware specified by this invention, have not suggested its very worthy safety-goal for any combination involving a push/pull door device, and more particularly have not suggested the particular construction concept for specifically a combination with a push/pull door device of the present invention;

i. The conception of the combination of components which provide the "control from the outside" has come only to this inventor; and whether or not any of the factors towards the combination including this purpose, by twist-type door control, leads to a combination for the formation of the door-controls as herein set forth, the ultimate combination has come only from this invention;

j. Commercial and industrial safety had long been a growing emphasis of government agencies, of litigations, and in insurance sponsorships;

k. Most persons of the prior art have surely been well aware of items of production and of product-components, such as linkages, metal rods, axial connectability of rod-sections for achieving joint movement, the manufacturing processes for the production of plates having holes and notches for special control purposes, and most general details of construction of all of the components used in making and assembly of the device of the present invention.

Accordingly, the Various concepts and components as separate knowledge factors of the prior art, are conceded and emphasized to have been widely known in the prior art; nevertheless, the prior art has not had such concepts in this overall combination.

V. INTRODUCTORY SUMMARY OF OPERATIVITY AND COMPONENTS, AS CONTRASTED TO THE PRIOR ART

So far as known to this inventor, the creativity in this field has been such that a logical understanding of the nature of the present invention may be particularly illustrated by the use of the push/pull door mechanisms in hospitals; so the invention is conveniently contrasted to the prior art by a short summary of the details of use of this invention in controlling the access and privacy-achieving status of any hospital room, the prior art as to releasability in this summary being that as shown in U.S. Pat. Nos. 4,003,593, and 3,89.7,092, as further referenced herein:

1. The door may be closed from either side, and the latch will automatically engage, this being a part of the prior art operability, by the cammed effect of the latch bolt engagement of the building's keeper plate, then pushed outwardly of the door's edge by the latch spring.
2. The latch effect may be released from either side, this also being a part of the prior art operability.
3. The door may be locked from the inside by a component separate from the prior art latch device, being of prior art operability for the patient's desire for privacy in non-emergency situations.
4. If locked from the inside by a prior art device, e.g., a deadbolt feature as a component separate from the prior art latch device, the locking may be released by that separate component from the inside, also a prior art operability.
5. As its own basic feature, the present invention provides a means for locking the prior art's latch components, by blocking the movement of at least two of those components by abutment features controllable from either the inside or the outside of the door. This is a very significant advance over the prior art, because it also provides for the ability for releasing the door's locking means, not merely from the inside (which would be achievable by the prior art if the lock were made by a device separate from any of the prior art's latch components), but achieves a lock-releasability of the locking means by a lock-control device on the outside of the door, even though the inside latch components have been caused to be in a locked condition by the inside person's turning of the locking knob to establish what he considers to be a locked condition of the door.
6. That is, and more particularly, it seems to be quite unquestionable that the present invention provides as a special and inevitably great advantage over the deadbolt installation's need to provide all the nurses and other authorized staff persons with a series of deadbolt keys, or even a lesser disadvantage of a "Master Key" policy; for the present invention achieves the "outside releasability" or over-riding of the lock, and in realistic consideration with other advantageous factors such as its smallness in size as contrasted to what the patient likely assumes is a heavy door-swing need, which of course requires only an infinitely smaller force to gain access.
7. Although this invention's latch-lock concepts provide for lock-releasability from the outside at all times, so as to be operable during an emergency-unlock necessity, the disruption of the patient's privacy in non-emergency times is effectively negated by providing that the unlocking actuator on the outside is in effect quite obscured so as to be concealed in a sense of being inconspicuous in consideration of its appearance and/or location and/or shape and/or size, so as to be used only by an authorized person who would have been instructed as to the location and how to use the manual control of the external lock-control member.
8. The overall invention is enhanced by the concept of the exterior door-control being provided as an inconspicuous body and/or shape in a manner that it would be quite unlikely for anyone who is not authorized nor knowledgeable to actuate the inconspicuous lock-release effect intentionally or even unintentionally.

VI. LISTING OF COMPONENTS, IN REFERENCE FORM

The invention described herein provides and illustrates the desired and patentably novel combination of concepts and features; and when considered both as particular concepts and features, particularly in their combinations, their patentability is submitted to have been shown, in the text and in the drawings.

More particularly, the concepts of the present invention have been illustrated by showing the latch/door releasing ability to be achieved by a person either inside or outside the door; and the achievement of the lock-releasing concepts is shown with particular respect to the provision of lock-release actuatable on both sides of the door by the provision of operative engagement of one or more components which are actuatable to abuttingly engage the latch mechanisms of each of the prior art door-controls.

Also, to avoid undue overcrowding of reference numerals, and because the several views show the correspondency of parts quite clearly, the duplication of reference numerals on the several views is kept at what seams to be a minimum consistent with convenience of reference and understanding.

For convenience of reference, although for many features the description could be considered as over-simplified for the sake of brevity, the various components are here listed as to the illustrative embodiments:

| | |
|---|---|
| 10 | door; |
| 12 | latchbolt; |
| 13 | strike plate; |
| 14 | door's free edge; |
| 16 | inner handle; |
| 18 | outer handle (downward, FIG. 2); |
| 20 | thumbturn knob (inside, FIG. 1); |
| 22 | primary control rod; |
| 24 | top hole for 22 in mounting bracket 26; |
| 26 | mounting bracket; |
| 28 | blocking plate; |
| 30 | set screws (2) for 28; |
| 32 | adjusting slot on 22; |

-continued

| | |
|---|---|
| 34 | handle head; |
| 34A | top corner of handle head; |
| 34B | bottom corner of handle head; |
| 36 | blocking engagement of 28 and 38/34A (FIG. 4) |
| 37 | outer handle (upward, FIG. 3); |
| 38 | stop pins of 34; |
| 40 | opposed flats on 22 (used for adjustments); |
| 42 | square hole in 20; |
| 43 | cylindrical outer end of 20; |
| 44 | hole in cover/housing for 20; |
| 45 | cover (FIGS. 4–6); |
| 46 | snap ring of 20; |
| 48 | driver on 34; |
| 52 | cam; |
| 53 | hole for 52 in mounting bracket 26; |
| 56 | lockbar; |
| 60 | latchbolt driveshaft; |
| 61 | arm of cam 52; |
| 62 | mounting screws (4) of mounting bracket 26; |
| 64 | mounting holes (4) mounting bracket 26; |
| 65 | mounting screws (2) for cover/housing; |
| 65A | mounting holes (2) for cover/housing; |
| 66 | nuts for screws 62 on 26; |
| 67 | cars on 26; |
| 68 | axial rivet which supports 34; |
| 69 | hole in 67 of screw 80 for 56; |
| 70 | snap ring of 52; |
| 71 | angle on handle for unlocking clearance; |
| 72 | washers for 52; |
| 73 | rectangular opening in cover/housing; |
| 74 | torsion spring; |
| 74A | coils of 74; |
| 75 | drive pin of 22; |
| 76 | hole for 75 in lockbar 56; |
| 77 | blocking engagement of 56 (FIGS. 10 and 16); |
| 78 | corner of 56; |
| 79 | veritcal slot of 56; |
| 80 | screw in 79/56; |
| 81 | washer for 80; |
| 82 | compression spring of 56; |
| 83 | head of screw 80; |
| 84 | emergency turn shaft |
| 85 | outer head of 84; |
| 86 | hole for 84 in cover/housing; |
| 87 | cover/housing for downward handle 18; |
| 88 | snap ring for 84; |
| 89 | groove of 84; |
| 90 | inner face of 84; |
| 91 | outer face of cover/housing; |
| 92 | inner circular wall of cover/housing 87; |
| 92A | outwardly-facing counterbore; |
| 93 | slot of 84; |
| 94 | tongue and slot connection of 84; |
| 95 | notch on lockbar 56; |
| 96 | cover/housing for upward handle 37; |
| 96A | hole region of 96; |
| 97 | inner circular wall of 96; |
| 98 | outer face of 96; |
| 99 | countersunk of outlet 86; |
| 100 | secondary control rod; |
| 101 | slot in 100; |
| 102 | snap ring on 100; |
| 103 | drive pin on 100; |
| 104 | bottom hole for pin 103 on lockbar 56; |
| 105 | hole in 67 for screw 65 of cover; |
| 106 | limited width on 37 between 34A and 34B; |
| 120 | reference axis of control rod 22; |
| 122 | reference axis of prior art latching control; |
| 124 | axis of axial rivet 68; and |
| 126 | axis for secondary control rod 100. |

VII. BRIEF SUMMARY OF THE PRESENT INVENTION AND THE INVENTIVE CONCEPTS

The present invention, and the various concepts which combine to show the overall device as per the Embodiments 1 and 2, are shown in the Drawings as cited in the summary of the Figures of Drawings (in Sec. VIII) and also as given a more broad explanation of the various Figures of the Drawings (also in Sec. VIII); and, for brevity of presentation of the concepts, it is to be noted that various components and concepts shown in the Figures of Drawings which are shown as expressly embodied in either of those embodiments may also be interchanged with the similar-function components and concepts and components of the other embodiment.

Thus, it is to be noted that there are actually three Embodiments, especially in consideration of the fact that the releasably locking components (blocking plate 28), of the 1st Embodiment may be replaced (e.g., by vertical bar 56 and pin 75) by a releasable blocker element of the 2nd Embodiment, and vice versa.

The concept of "releasability from the outside" may be achieved by either of those elements.

In other words, e.g., the element 28 may be used as the releasable blocking component as to the outer control device, as well as the releasably controlling device of the inside control apparatus, and, similarly, the releasable blocker element 56 may be used as either the outside and inside device, or as to both of the outside and inside devices; and no substantial adaptation need be used. The extent of the adaptation needs to be only that of such matters as that of dimensions to be sure of avoidance of interference and other changes in mounting details which would be obvious to the installer or user, keeping in mind the basic characteristics of the overall invention in the door-control system as a whole, as may be defined as (a) providing the latch-releasing linkage with at least one movable member whose participation in the latch-releasing function is to be moved to be in the path of one or more other members of the latch-releasing linkage; and (b) providing an actuator means to move that member as needed to provide such participation, thus providing a locking effect which prevents the latch-releasing action of that linkage; and (c) providing an actuator means which is manually actuatable from a location remote from a location of the actuator means stated above, for moving that element out of the path of the abutting encounter and thus releasing the lock effect caused as stated above.

The special function of the outside control is shown by the following scenario:

(1): That is, the patient's desired continual door-locked "control from the inside" until a "locked-in" emergency occurs, caused by the patient having turned the inside control knob to a locked-in condition, takes advantage of the realistic scene; i.e., once the patient has achieved that locked-in condition his need for any continued manipulation of that inside control knob ceases to exist, except for that one fraction of a moment when the nurse desires to exert her entrance-ability by the "control from the outside" instantaneously releasing of the locked condition during the instance of opening the door for the sufficient, and very small, time only to gain entrance to the room.

(2): The nurse needs only a moment to effect those efforts, and the only time during which she could not do those small efforts would be if the patient were pre-disposed to hang-on the inside control knob, and would try to maintain his door-locking attempts during the nurse's unlocking attempts, which would be highly unlikely, particularly since he would not know that he was in a contest because he would be unaware that the nurse would have the ability to unlock the door from the outside, because of the inconspicuous nature of the "control from the outside".

VIII. DESCRIPTION OF THE FIGURES OF THE DRAWINGS, AS TO EMBODIMENTS, LOCK-CONDITIONS, AND OTHER DETAILS AS TO THE FIGURES OF THE DRAWINGS

The above description of the novel and advantageous locking and lock-releasability device, which is provided as shown by a novel combination of features, is of somewhat introductory and generalized form. More particular details, concepts, and features are set forth in the following and more detailed description of the illustrative embodiments, taken in conjunction with the accompanying drawings, which are of somewhat schematic and diagrammatic nature for an understanding of the concepts and use of the present invention as are illustrated in these embodiments.

(It should be introductorily noted that the words "locked" and "latched" are not synonymous. That is, the word "locked" refers to a condition in which the latch bolt can not be retracted during any period in which the door has been locked from inside the restroom, except by only a certain procedure other than pushing or pulling on one of the handles; whereas, the word "latched" means a closed condition of the door which does not require the extra specific effort of changing from a locked position other than pushing or pulling on one of the handles. This distinction also applies to forms of those words.)

The 1st embodiment illustrates the inventive concepts in FIGS. 1, 2, 4, 5, 6, 7, 8, 9, 10, 11, 12, 13, 20, and 21; and the 2nd embodiment illustrates the inventive concepts in FIGS. 1, 3, 4, 5, 6, 7, 14, 15, 16, 17, 18, 19, 20, and 22.

The parts are shown in locked position in FIGS. 4, 7, 8, 9, 10, 11, 14, 15, 16, 17; and the parts are shown in unlocked position in FIGS. 5, 6, 12, 13, 18, 19.

(In the various Figures of Drawings, cross-sectional views should be understood as some being of a "dead-section" nature, which omit certain components which would be in the foreground of the view as indicated by section-lines, to avoid obscuring of details more distant in the view which would be either obscured or forced to be shown only by dash lines to show a hidden nature and/or better (or as well as) seen and described in another view; e.g., in FIG. 8, the lockbar 56 is not shown, for it is better (or as well as) shown in FIGS. 9–13; and others are partial sections leaving out certain components in views in which the background components would tend to clutter components which would be in the view as taken by the designated section-line; e.g., the emergency shaft components 84 and others on the axis of rod 22 are not shown in FIGS. 10–13, but are shown in FIG. 8, rather than to try to show precisely all of the components which realistically would be seen in that sectional view.)

(Further, since the location and orientation of bolt 12 is shown in FIGS. 1–3, the bolt 12 and the striker plate 13 are shown only schematically in the other views (FIGS. 6, 7, 11, 13, 15, 17, and 19), although in strict orthographic projection they would appear behind the view to which they are bracketed, and with the bolt 12 shown with its axis and axis of travel shown in those Figures in end view, its axis being perpendicular to the plane of the door panel.)

(These variations from a strictly orthographic projection will be understood by all persons familiar with orthographic projections and section views, at least with the explanations given herein, and the general purpose of sectional views being that to clarify the understanding and ease of comprehension.)

Also other conventional techniques are used, such as the presentation of a detail in one view which is not shown as being presented by a section-line in the first of those views; e.g., in FIG. 6 there is shown (in phantom lines) the handle means 16, which would not be seen as viewed in FIG. 5 by the section-line 6—6.

More particularly:

Figure 8:
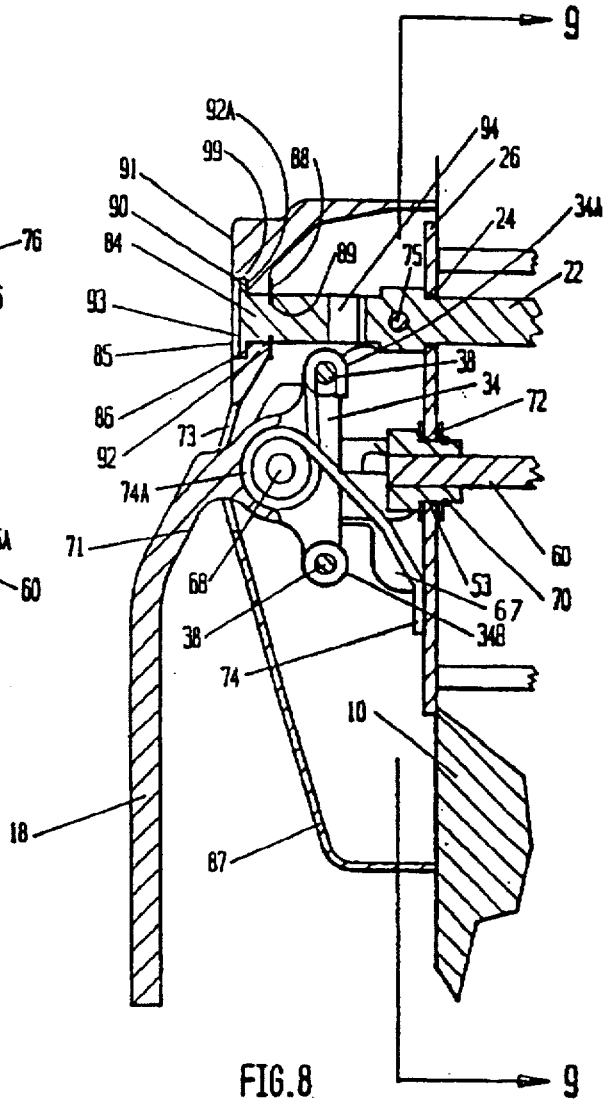
FIG. 8 is a vertical cross-sectional view of the portion of the overall assembly for mounting on the outside of the door, providing for an unlocking of the door latch bolt without use of the thumbturn which is shown in FIGS. 1, 4, and 5, and is also shown as a cross-section generally as taken by the Section-line 8—8 of FIG. 9, and with parts shown in locked position.
Figure 13:
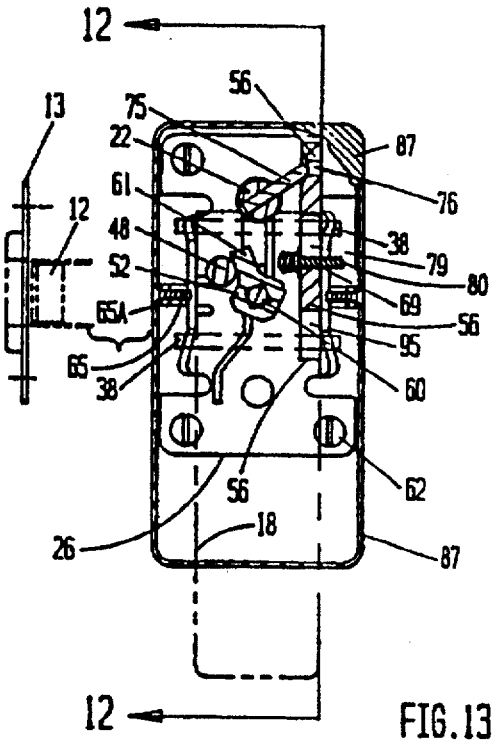
FIG. 13 is a vertical cross-section view generally shown as taken by Section-line 13—13 of FIG. 12, in an unlocked position.
Figure 15:
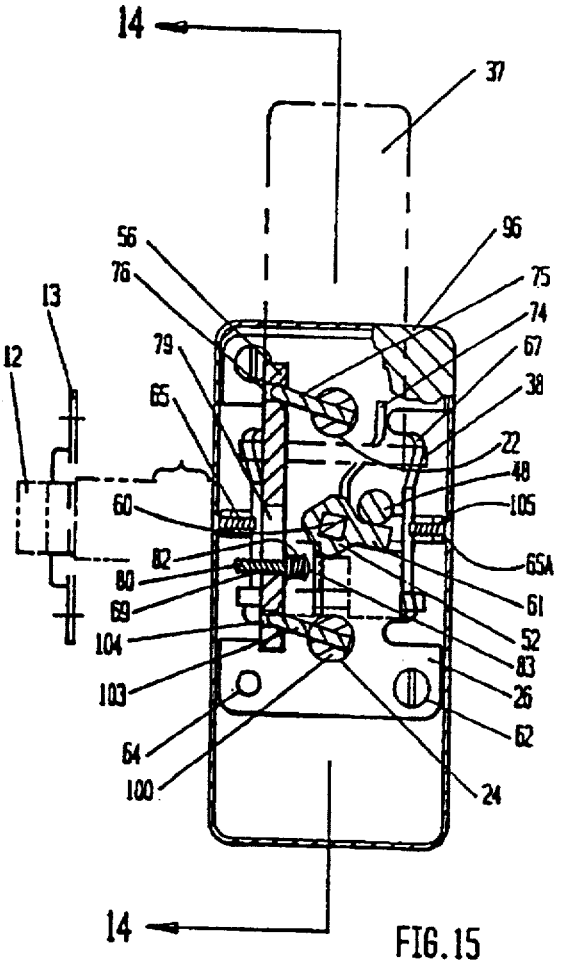
Figure 14:
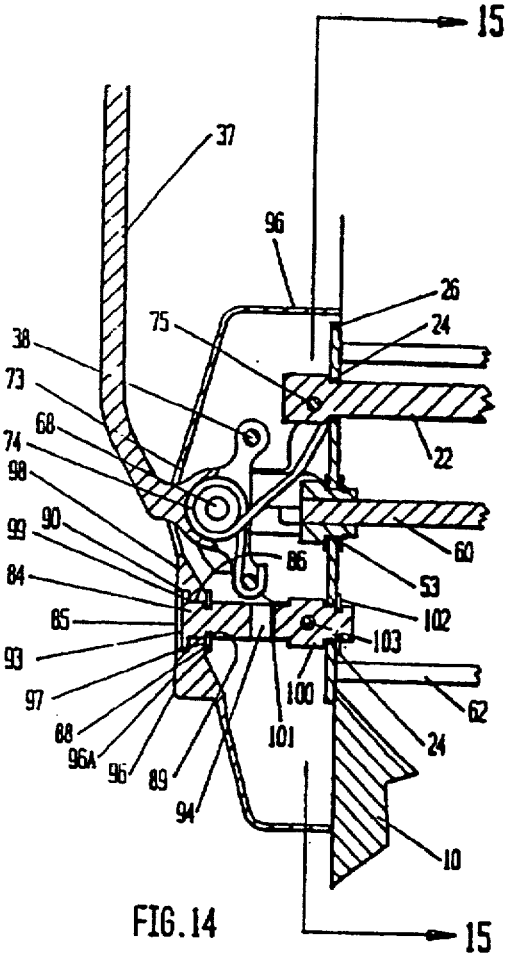
Figure 19:
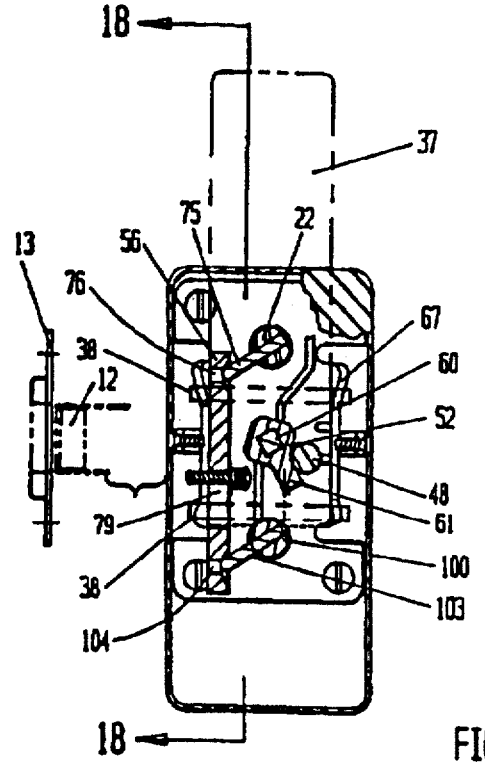
Figure 18:
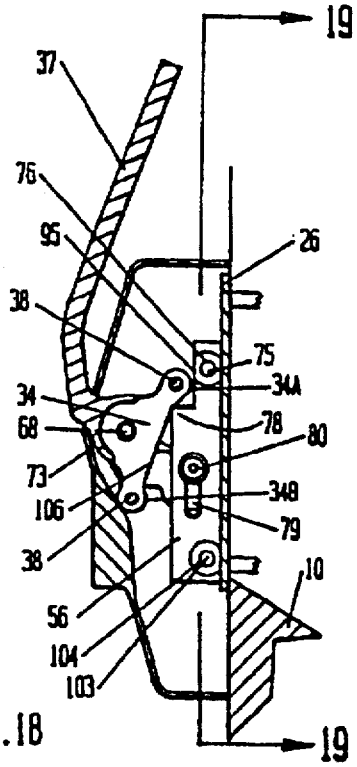
Figure 17:
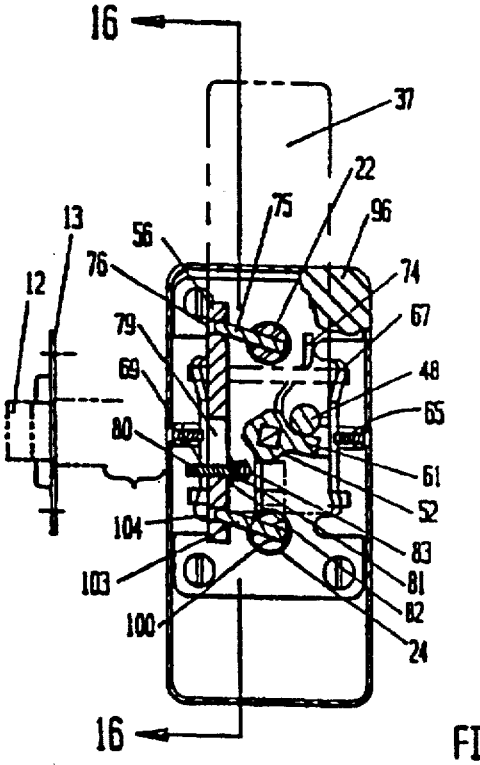
Figure 16:
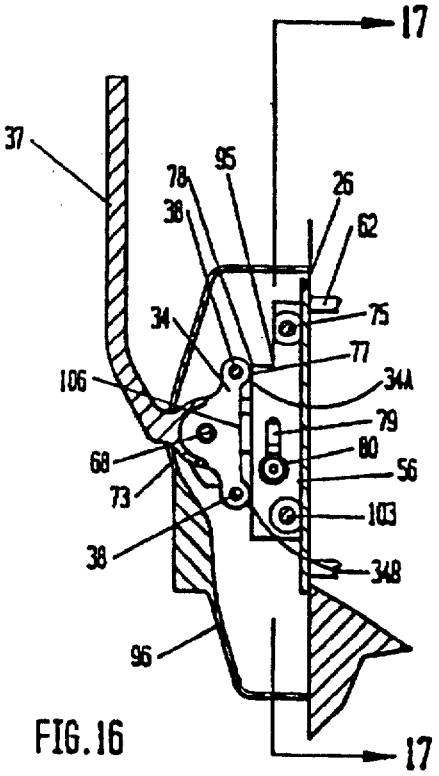
Figure 20:
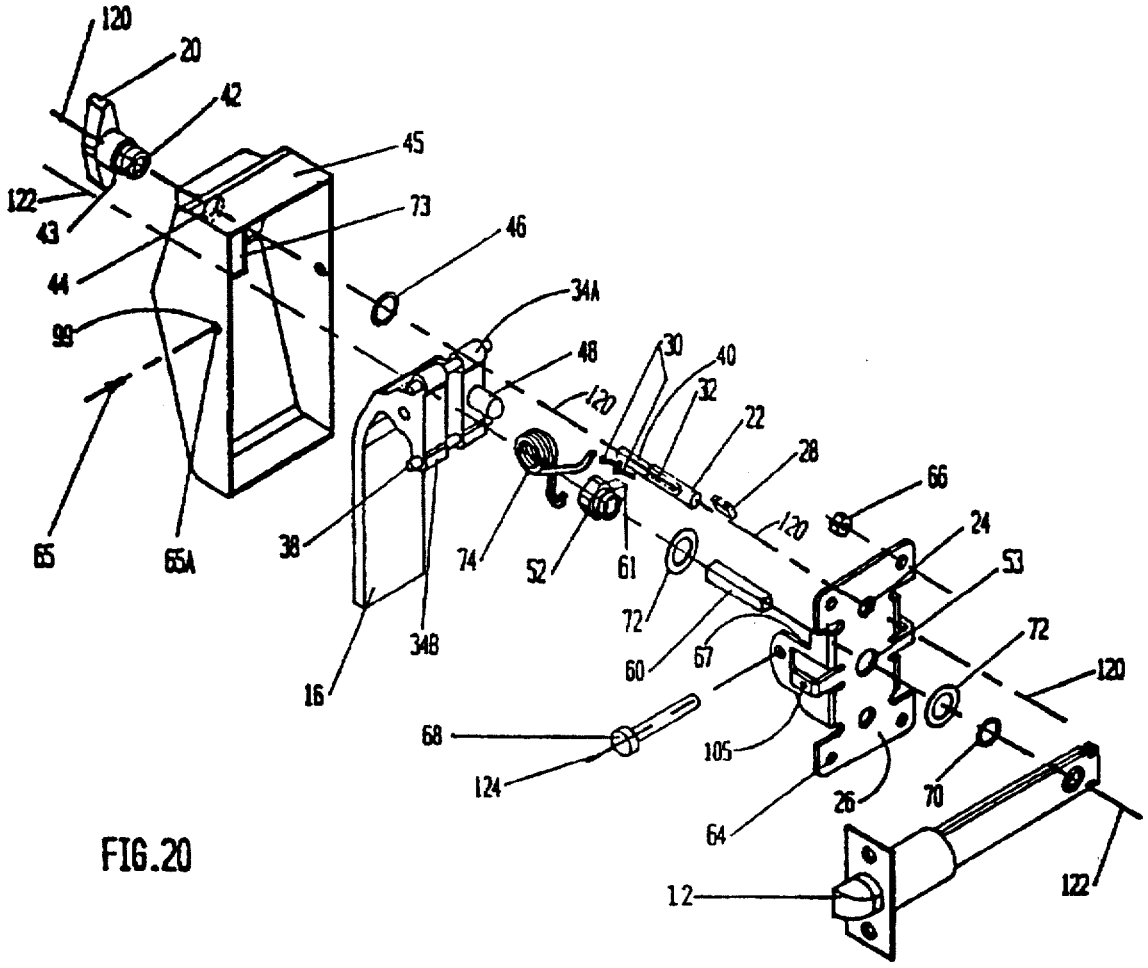
Figure 21:
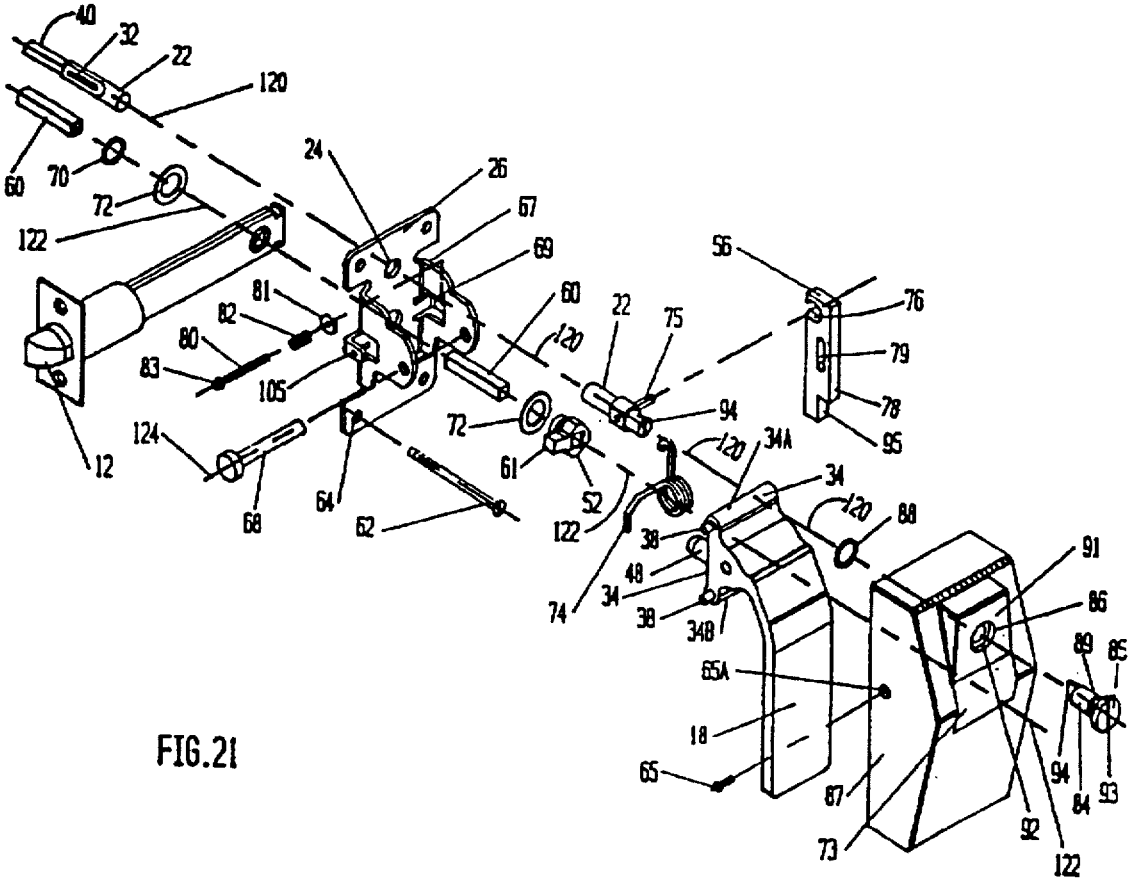
Figure 22:
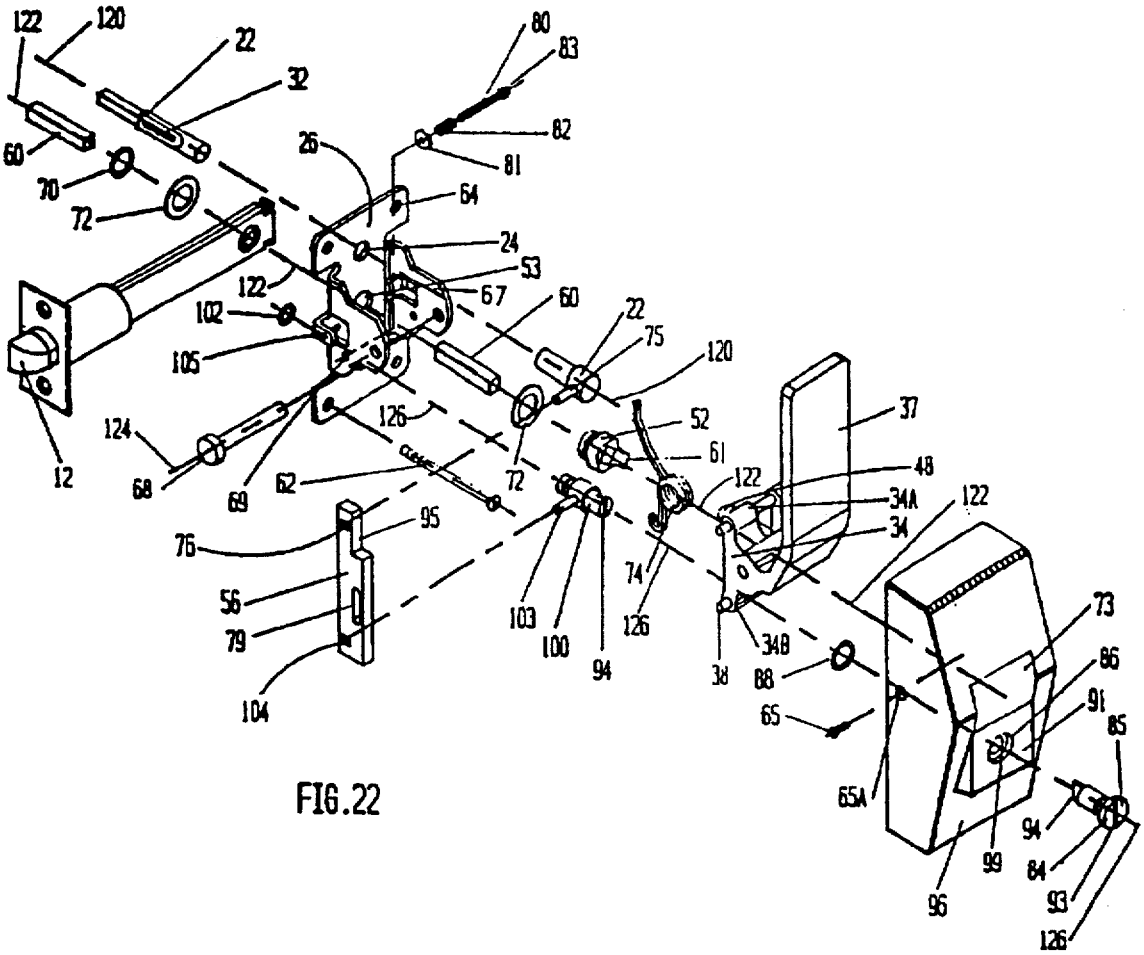

FIG. 14 is a vertical cross-sectional view of the 2nd Embodiment, generally as shown in FIG. 8, but having some parts which are interchanged vertically, i.e., with the operating handle in an upright position as shown in FIGS. 3, 16, 17, 18, 19, and 22, in contrast to the handle shown in downward position in FIGS. 2, 8, 9, 10, 11, 12, 13, and 21, also shown generally as taken by Section-line 14—14 of FIG. 15, in an unlocked position;

FIG. 15 is a vertical cross-sectional view, generally as shown by Section-line 15—15 of FIG. 14, the cutting plane for the sectional view being parallel to the door faces, in a locked position;

FIG. 16 is a vertical cross-sectional view showing the parts in a locked position, with an Embodiment showing a handle extending upwardly as in FIGS. 3, 16, 17, 18, 19 and 22, this view being a vertical cross-sectional view shown generally as shown by Section-line 16—16 of FIG. 17;

FIG. 17 is a vertical cross-sectional view shown generally as taken by Section-line 17—17 of FIG. 16; in a locked position;

FIG. 18 is a detail cross-sectional view similar to that of FIG. 16, except showing the parts in an unlocked position, this view being a vertical cross-sectional view as shown generally by Section-line 18—18 of FIG. 19;

FIG. 19 is a vertical cross-sectional view shown generally as taken by Section-line 19—19 of FIG. 18, in an unlocked position; and FIGS. 20–22 are exploded views with the parts shown in their relationship to one another, to the extent which seems desirable in view of the complexity of the case and the multitude of its components, and these particular Figures the Drawings are described in detail in Sec. X below.

IX. DETAILED DESCRIPTION OF THE PREFERRED EMBODIMENTS, GENERALLY AS TO FIGS. 1–22

Referring now to the drawings, the embodiments of the present invention and its concepts are illustratively shown in a typical and particularly advantageous use, i.e., for providing a very special locking operativity feature in conjunction with the latch apparatus of push/pull type, for a door (or movable panel) 10 of a bathroom (or rigid structure supporting the movable panel) of a hospital.

In that special use, it is desired to have a door which is lockable with special operational characteristics, particularly as summarized herein; and the present invention fulfills the goal of supplying those special and long-known needs, as the present invention is shown and described, in a hospital setting of a prior art latch. Such prior art latch, although very meritorious, has failed, as have all the other prior art known to this inventor, to provide the special lock and lock-releasing operativity of this present invention, even though such operativity has been long needed and desired.

(It should be understood that in the prior art, as here also, the latchbolt (or extendible member protruding from the free edge of the movable panel)12 in its resting condition is biased by a latchspring (not shown) to its outer position (latched); and in the prior art, is only retracted by one of the manually operable handles (or actuator means shown as handles) as described herein, in addition of being temporarily cammed to a retracted position during the instant of a door-closing action.)

Figure 6:
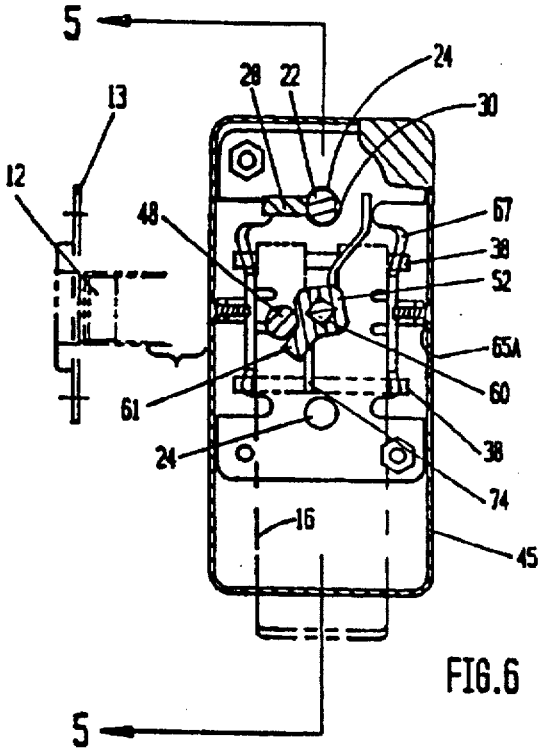
FIG. 6 is a vertical and transverse cross-sectional view generally as taken by Section line 6—6 of FIG. 5 showing the parts in a unlocked position.
Figure 7:
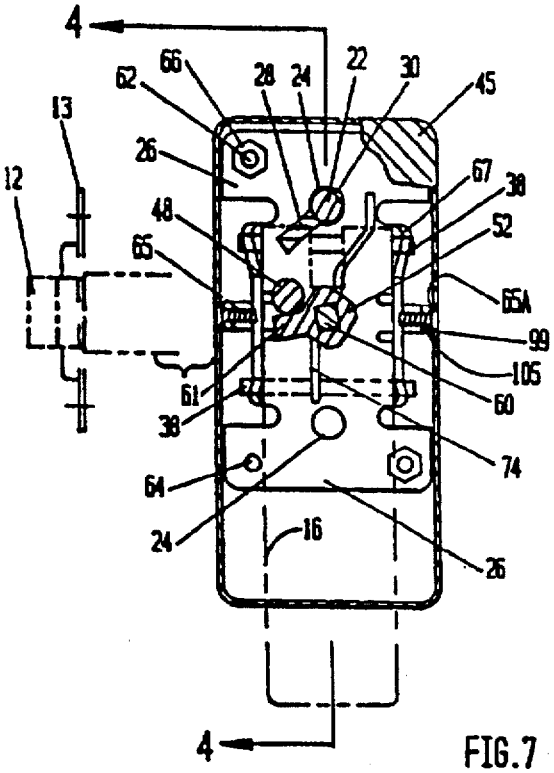
FIG. 7 is a vertical and transverse cross-sectional view generally as taken by Section line 7—7 of FIG. 4, showing the parts in a locked position.

As shown in the embodiments, the door 10 is latchable (or retained against swinging movement) by a latchbolt 12 which is movable from a latching position (FIGS. 1–3) in which the bolt 12 projects into a door frame strike plate (or retainer means) 13 (also believed to be called a "striker plate," a "keeper," or a "keeper plate"), the bolt 12 projecting from the free edge 14 of the door 10 for engagement with the strike plate 13 of the building; and when so engaged, blocks the door 10 from swinging open (to a first or open panel-position), and be released as detailed herein, to a retracted position (to a second or closed panel-position) to free the door 10 for opening (the latchbolt 12 being shown schematically in FIGS. 6, 7, and 15).

The prior art handles 16 and 18, respectively inner and outer, are mounted on opposite sides (first face and second face) of the door 10 adjacent to the door's free edge 14, to provide for retraction of the latchbolt 12, in the embodiments.

The prior art's latch bolt 12 can be-unlatched (unless it has been locked by the concepts of the present invention) by an inward-pull on the inward handle 16, or from a position outside of the door 10 by pushing on the outer handle 18, all of this numerical description so far in this Section IX being that of the prior art which has long had latchability but not practical-lockability, for it lacked this present invention's concept of lock releasability from the outside, providing the vital safety release of the lock, and thus avoiding a "locked in" tragedy.

A very significant concept of the present invention, accordingly, is its provision that the door 10's latch bolt 12 may be released by a specially authorized person on the outside of the door 10 regardless of whether a person on the inside of the door has locked it, as explained herein.

Figure 4:
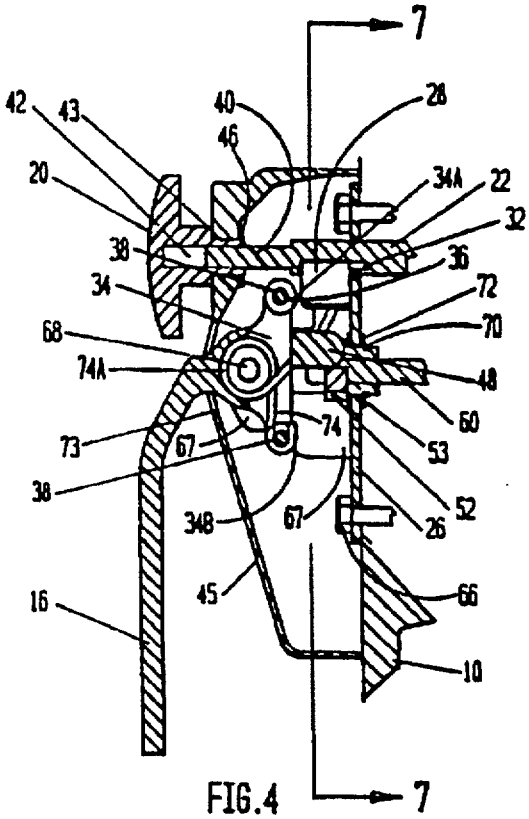
FIG. 4 is a vertical cross-sectional view, showing the device of FIG. 1 in its locked position, the cutting plane for the cross-sectional view being perpendicular to the door faces, and also generally as shown per the Section line 4—4 of FIG. 7.
Figure 9:
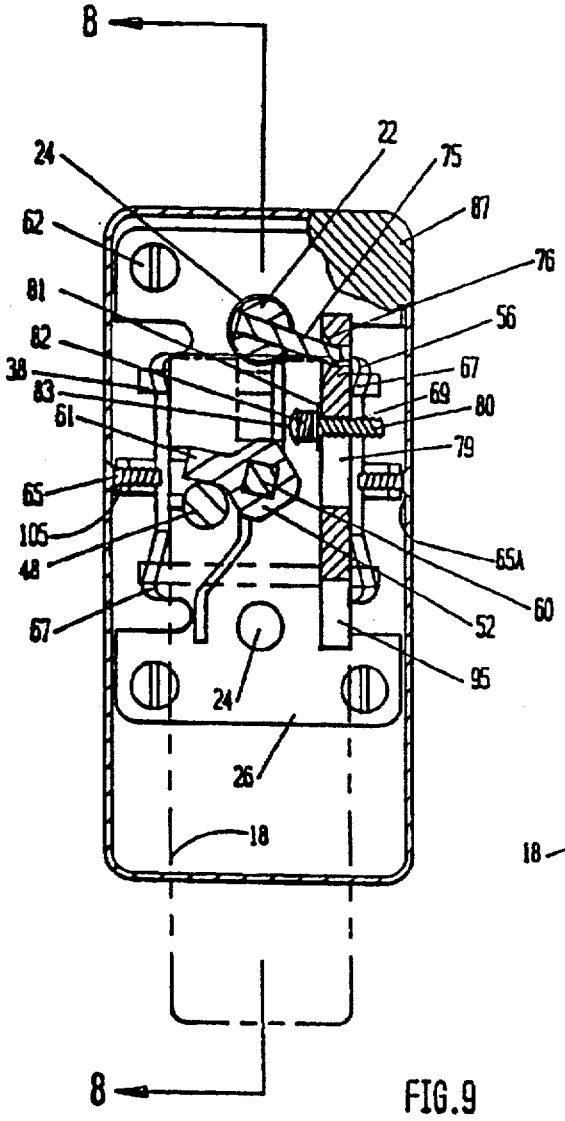
FIG. 9 is a vertical cross-sectional view generally shown as taken by Section-line 9—9 of FIG. 8, in locked position.

Referring now to drawing FIG. [40] *4* which is showing the interior of the components on the inside of the door 10, the latchbolt 12, shown schematically in FIGS. [60] *6*, 7, and 15, locking control by the thumbturn knob 20; and, as shown in FIG. 4 by turning thumbturn knob 20 with a clockwise motion, it moves (here rotates) the primary control rod (or control member) 22, the rod 22 being a component which goes through the hole 24 shown in the mounting bracket (or support means) 26 which is mounted on the inner face of the door 10, the control rod 22 achieving a plurality of functions as detailed herein.

Still observing FIGS. 4 and 7, it is to be seen that a blocking plate or abutment member 28 is attached as a radially extending arm from the primary control rod 22 with two screws 30, and an elongated slot 32 is provided in primary control rod 22, to allow for adjusting for different door thickness. By turning thumbturn 20 and its [.] blocking plate 28 which is carried on control shaft 22, with counter clockwise motion (as considered from inside the room) as is shown by FIGS. 4 and 7 as coming after the unlocked position view of FIG. 5, blocking plate 28 is swung radially about the axis of shaft 22 approximately 45 degrees to locking engagement 36 blocking against a head 34 (more particularly stop pin 38 which is carried as an abutment by the rounded corner end 34A of the head 34 of inner handle 16) the blocking position 36 being shown in FIG. 4.

This (FIG. 4) blocking of movement of the handle 16 by the reaction force of abutment 28 acting perpendicularly to the plane of the door, achieves a privacy-locked condition, and a person standing outside the door 10 cannot unlock the locking effect of the blocking plate 28's engagement (36) with handle head 34A, merely by trying to actuate the outside handle 18 (or 37 mentioned below).

That is, any attempted pulling or pushing, of either of outside handles 18 or 37, will not operate the unlocking mechanism when blocking plate 28 is in this operative abutting encounter position (FIGS. 4 and 7) of abutment of blocking plate 28 with stop pin 38 of head 34A.

In the form shown, the thumbturn 20 and the primary control rod 22 are made to be non-rotatable with respect to one another by the control rod 22 being provided with opposed flats 40 at its end which is received with a correspondingly square cross-sectioned recess 42 in the thumb turn 20. The flats 40 are shown as being approximately one inch in length, which (also with slot 32) will allow for adjusting for different door thicknesses.

The cylindrical outer end 43 of the thumbturn 20 passes movably through a hole 44 in cover 45 and is held therein by a snap ring 46 which holds it axially but permits its relative rotation with respect to hole 44 and cover 45.

Primary control rod 22, mounted through a hole 24 adjacent the top of mounting bracket 26, extends through the inside mounting bracket 26, through the door, and through the outside mounting bracket 26, as shown in FIGS. 4–8, and 14–15.

Figure 5:
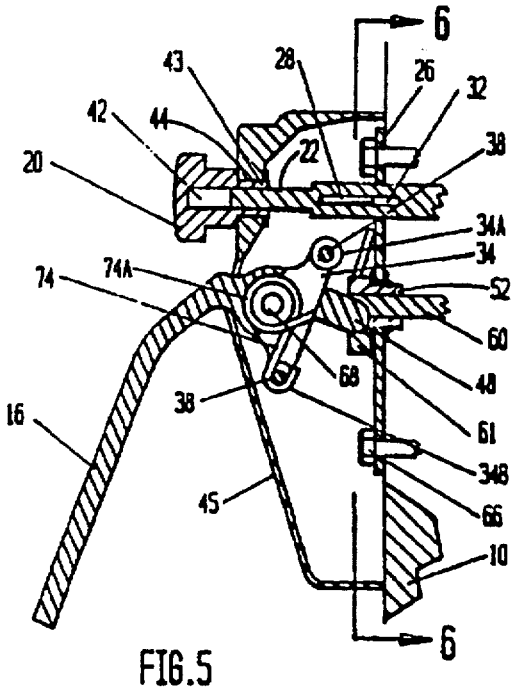
FIG. 5 is a cross-sectional view like that of FIG. 4, but showing the device of FIG. 1 in its unlocked position, and also generally as per the Section line 5—5 of FIG. 6; and showing the thumb turn having been rotated 90° to unlocked position by the patient inside the room.

Referring now to drawing FIG. 5, when a person wants to leave the bathroom, he or she will turn the thumbturn 20 approximately 45 degrees clockwise, which will rotate the primary control rod 22, and rotate blocking plate 28 which is attached to primary control rod 22, to a horizontal position, the unlocked condition as shown in FIG. 5, freeing the blocking at 36.

In FIG. 5, in contrast to the locked condition of FIG. 4, achieving the unlocked condition of this present invention from the inside of the door, the handle head 34 on handle 16 is free to rotate upward, clockwise as shown about axis 68, allowing the unlatching mechanism on each side of the door to operate to open the door, as herein detailed.

The latch/unlatch mechanism (or linkage of movable force-transmission) of the prior art is shown here by a drive pin 48 affixed to the handle 16. When handle 16 is rotated to its position in FIG. 5, i.e., pulled upward and outwardly, the drive pin 48 which is engaged against cam 52 (FIG. 4, 6, and FIG. 7) on the latch bolt drive shaft 60 rotates with cam 52 in the same direction. The latch bolt drive shaft 60 extends through the retracting latch bolt 12 and into cam 52 on [he opposite side of door, in the mechanism mounted on the outside of the door (shown in FIGS. 2 and 3). Pulling up on handle 16 will remove latch bolt 12 (60) from the strike plate 13 and allow door 10 to be opened.

Cam 52 is carried by the square shaft 60 at a location closely adjacent the wall of the mounting bracket 26 for the arm 61 of the cam 52 to rotate and actuate the reciprocal motion of the latch bolt 12.

Also as to the prior art features, housed with the cover 45 (FIG. 7) is the mounting bracket 26, which helps align and support the cam 52 on mounting bracket 26, through hole 53 of mounting bracket 26.

Also as to the prior art features, four screws 62 extend through mounting holes 64, with four standard nuts 66 as shown to mount the mounting bracket 26 to the door 10.

Also as to the prior art features, the handle 16 is pivotably mounted securely to ears 67 of mounting bracket 26 by axial rivet (or shaft) 68 (FIG. 4).

Also as to the prior art features, stop pins 38 are shown, one adjacent the top [Of] *of* handle head 34 and adjacent the bottom of handle head 34; and it is the prior art's actuator head 34's abutment against the releasable control plate *28* (or 56) (FIGS. 4, 10, 16) which prevents the driver from pushing the prior art's force-transmission linkage means 52, 60, 61 to unlatch the latchbolt 12. Those stop pins 38, respectively, as carried by the handle head 34, partake of that actuator head 34's rotation of either handle 16, 18, or 37. Those pins govern the travel, of handle 16's rotation by abutment with ears 67 of mounting bracket 26. Torsion spring 74 is retained on handle 16 by axial rivet 68 upon the shank of which the central coils 74A of the torsion-spring 74 are revolvably mounted. The bottom stop pin 38 (FIG. 4) retains the hooked other end of spring 74 pulling inward (leftwardly as shown in FIG. 5) on handle 16 rotates it about axial rivet 68, which applies pressure to spring 74, which spring biases, when the handle is released, the handle 16 to its latched (FIG. 4) position.

According to the present invention, and building upon the concepts and construction of the prior art latch/unlatch device, the invention is detailed herein.

After a patient or other persons enters the bathroom and closes the door 10, he or she may then rotate the thumbturner 20 to achieve locked position 36 (FIG. 4); and, as now explained, the operativity of the components as shown in FIGS. 8–13 will be seen to achieve the very significant advantage of the override feature of this invention, i.e., the control by a person outside the room of a locked condition to an unlocked condition after the locked condition has been established by the manual action upon the thumb turn 20.

This override operativity, as shown particularly in FIGS. 4–13, is to be seen as a result of the thumbturn 20, and the primary control rod 22 being provided to have such a relative movement (here coaxial), and thus manual action on thumbturn 20 gives the corresponding rotation action of the control rod 22 whose outside-controlled rotation is of primary importance in achieving the override effect, as now described with respect to the illustrative embodiment.

The rotation of the control rod 22 is (FIG. 9) carried by the rod 22 to a drive pin 75 extending through a hole 76 on a locking bar (or vertical control plate) 56 and extends perpendicularly to the axis of control rod 22, this drive pin 75 being a control component of the device on the outside of the door 10, whose role and description are detailed below in connection with FIGS. 8–13.

Figure 10:
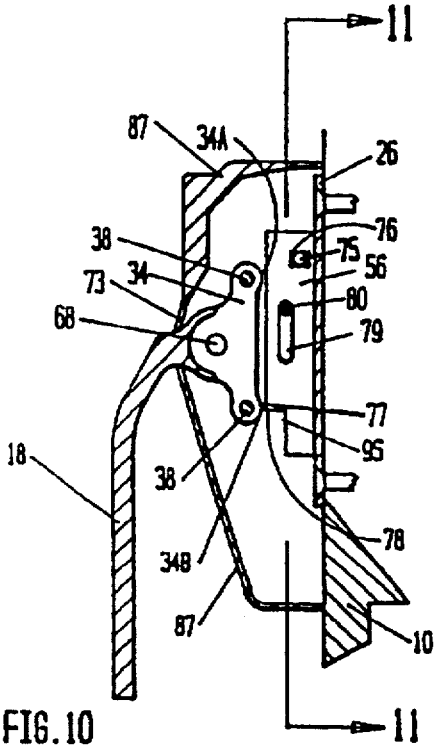
FIG. 10 is a detail cross-sectional view, primarily to show the handle and the handle head in locked position, this view being a vertical cross-sectional view shown generally as taken by Section-line 10—10 of FIG. 11.

When the primary control rod 22 is rotated by the thumbturner 20 counter-clockwise (as viewed from inside the bathroom, see FIG. 4), the drive pin 75 (FIG. 9), which is engaged through hole 76 through the primary lock bar 56 moves the primary-locking bar 56 down to its locked position (FIG. 10), by abutting engagement 77 having a reaction type blocking force against the actuator head 34 of the handle means, which force is in a plane perpendicular to the plane of the door, at the outside corner 78 of locking bar 56 as shown in FIG. 10 by the lower corner 34B of the handle head 34 on the outer handle 18, that engagement preventing handle 18 from being pushed to unlatch the door 10.

It will be seen that the abutment members 28 and 56 are supported so as to have a plane of movement, in movement into and from the position of operative encounter with the actuator means 34 of the handle, which plane is perpendicular to the plane of movement of the actuator means in its movement for causing withdrawal of the latchbolt from its panel-maintaining extended position.

As to locking bar 56, its role in providing a locking control is shown in FIGS. 9–13. As there shown, and particularly as noticing FIGS. 10 and 12, it is a vertical bar which is slidable vertically with respect to the mounting bracket 26 and its vertically extending ear or flange 67 (FIG. 9); and more particularly as to vertical reciprocation, its vertical movement, upwardly and downwardly, is limited by a vertical slot 79 in locking bar 56, through which extends a screw 80 which is screwed into hole 69 of the ear 67 of the mounting bracket 26. The holding as shown is more particularly by the head 83 of the screw 80 as to which a washer 81 and compression spring 82 provide the necessary slippage of the locking bar 56, and the bar or plate 56 is held on one side by the ear 67 of mounting bracket 26, and on the other side by the washer 81 and the compression spring 82.

Figure 12:
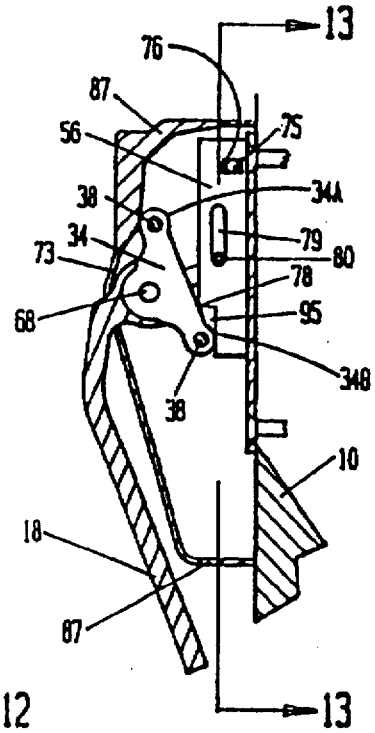
FIG. 12 is a detail cross-sectional view similar to FIG. 10, showing the parts in an unlocked position, this view being a vertical cross-sectional view shown generally as taken by Section-line 12—12 of FIG. 13.
Figure 11:
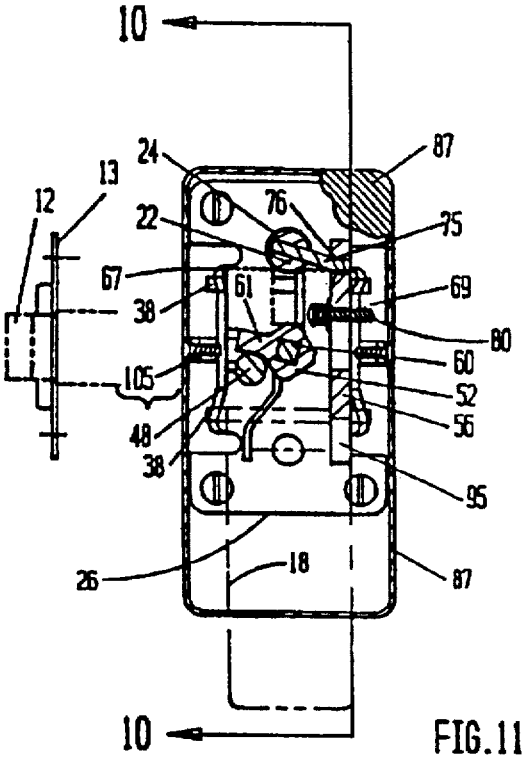
FIG. 11 is a vertical cross-section view generally shown as taken by Section-line 11—11 of FIG. 10, in a locked position.

The action of the locking bar 56, as shown in all of those FIGS. 9–13, is caused by the action of the pin 75's engagement of the hole 76 of locking bar 56 as previously mentioned, as the control rod 22 (or a control rod 84 which is an extension of the control rod 22 as further described below) is revolved, the pin 75 by its engagement with the locking bar hole 76 moves the locking bar 56 into and between a locking position shown in FIG. 10 and an unlocked position shown in FIG. 12.

Thus the locked and unlocked positions, respectively, are shown in FIGS. 10 and 12, as limited by the two ends of the slot 79 of locking bar 56 as the screw 80 is engaged by the end of the slot 79 during the movement of pin 75's revolving and with the hole 76 of locking bar 56 partaking of that motion of pin 75.

The effect of the sliding of locking bar 56 as shown in FIGS. 10 and 12, is (FIG. 10) that the head 34B of handle head 34 is stopped at blocking location 77 by its engagement with corner 78 of locking bar 56. This is a position of locked travel of the handle 18 against being pushed inwardly, because any attempted movement of the handle 18 toward the door 10, as the handle 18 would be rotating about the axle rivet 68, would be blocked by the engagement of 34B and the corner 78 of locking bar 56.

Unlocked position of the handle 18, as shown as achieved in FIG. 12, is caused by the locking bar 56 having been moved upwardly by the action of pin 75 (and hole 76) pulling the locking bar 56 to an upward position (FIG. 12) in which the upward travel of the locking bar corner 78 releases its engagement 77 with the lower corner of the handle head 34B. This permits the handle head 34 to move inwardly, now with the blocking interference of engagement 77 having been released, permitting the free movement of the handle 18 inwardly toward the door 10, a continuation of the inward-direction handle movement which the nurse started by pushing the handle 18, which simultaneously freed the lock at effect of the 1st embodiment (contrasting FIG. 10 with FIG. 12).

In an emergency situation, in which a patient or other person is locked in the bathroom and is unable to operate the thumbturner 20, to now unlock the door, the present invention provides the great advantage of providing convenient access by the nurse to open the door in spite of the lock as caused by the patient turning the thumbturner 20 to its locked position. Shown best in FIG. 8, an emergency control shaft 84 having an outer head 85 (FIG. 8), extends through a hole 86 in the cover 87.

Figure 1:
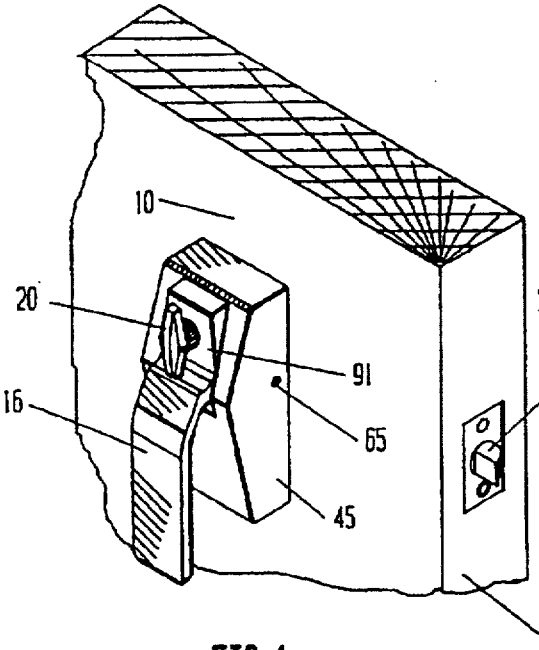
FIG. 1 is a pictorial view looking at the inside face and the outer side-edge of a bathroom door which is equipped with the locking means of both Embodiments of this invention, positioned on the inside face of the door, as the installation is seen when installed on the inside face of a bathroom door.
Figure 2:
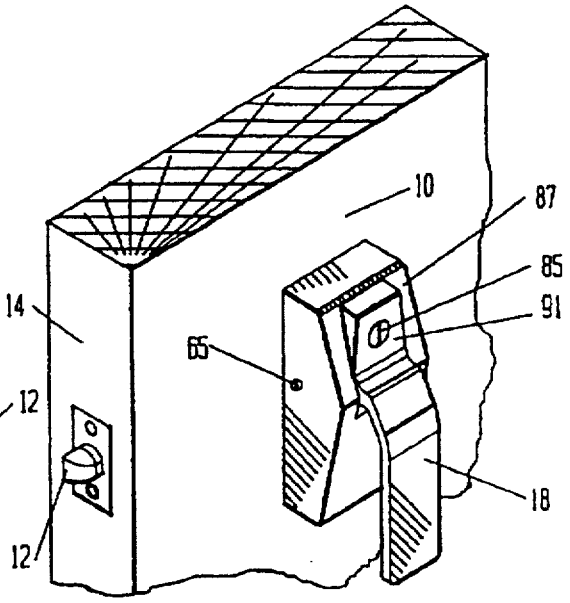
FIG. 2 is a pictorial view looking at the door's outer face and the outer side-edge of the door equipped with unlocking means of the 1st Embodiment of this invention, as would be needed in an emergency situation (such as that of a patient having locked himself in a room but unable to unlock the door for someone to enter or the patient to leave the room)

The outer head 85 is shown as an integral enlargement of the shaft 84, and appears as a general button-shape, which when assembled into the cover 87 through the hole 86 would be seen as a face 91 area of the cover 87. (FIG. 2).

The shaft 84 is held against axial movement outwardly (leftwardly) by a snap ring 88 which fits into an annular groove 89 of the shaft 84 and which abuts against the inwardly-facing circular wall 92 of the cover 87 in the region of the hole 86. The shaft 84 is held against axial movement in the other (rightwardly as shown in FIG. 8) direction by the inwardly-directed head or shoulder face 90 of the outer head 85 engaging the outer face 91 of the cover 87, or preferably as shown by fittingly engaging a counterbore circular wall 92A of the outer face 91 of the cover 87.

The emergency control shaft 84 has a slot 93 in depth and width which will receive a screwdriver or a coin, etc., to be inserted into slot 93, for turning emergency control shaft 84 (counter-clockwise in the form shown). A significant factor of the outer head 85 is that the head 85 does not give an appearance of being a control element; for it is an advantage that non-authorized persons would not be able to think that it is a door knob or a control knob providing the emergency control of unlocking ability.

The control shaft 84 is coupled to the primary control rod 22 by a tongue and slot connection 94 on the shaft 84 and the control rod 22 locking them against relative rotation.

Turning the emergency control shaft 84, which in a sense can be considered to be an axial extension of control rod 22, as shown in FIG. 8 as coupled by a tongue and slot connection 94 (by turning outer head 85) counter-clockwise, rotates the primary control rod 22 as shown, which has the drive pin 75 attached to it as a radial arm (and quite simarily to blocking plate 28 as shown in FIG. 4 on the inside of the door), and the drive pin 75 is engaged into primary locking bar 56 through hole 76.

When emergency control shaft 84 (by turning. outer head 85) is turned counter-clockwise as viewed from the outside, this will pull up the primary locking bar 56 to its unlocked position as shown in FIG. 12. A notch 95 on primary locking bar 56 provides clearance (unlocking effect) of handle head 34 to rotate forward by pushing forward (rightwardly as shown) on handle 18. Handle 18 is then free to be pushed forwardly to operate the unlatching mechanism of the prior art, e.g., shown in these embodiment by the prior art features of cam 52 and the driver 48, Which had no locking ability such as this invention provides by the operativity of its locking bar 56 and blocking plate 28.

The cover 87 is mounted to mounting bracket 26 through hole 105 by screws 65 through side holes 65A located on the side of the cover 87.

Figure 3:
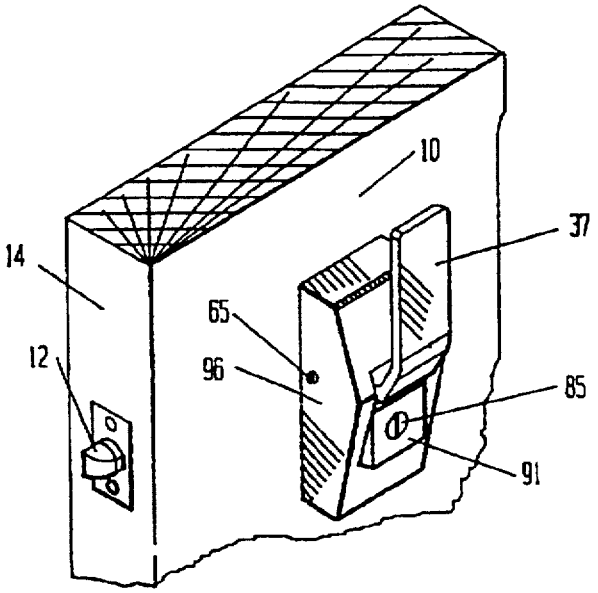
FIG. 3 is a pictorial view of the outer door face portion of the device as shown in FIG. 2, but in a 2nd Embodiment in which the position of the handle and the emergency unlocking mechanism are vertically reversed from that of FIG. 2.

FIG. 3 illustrates Embodiment No. 2 of the present invention; and its most visable feature, in comparison to Embodiment No. 1 as shown in FIG. 2, is that handle 37 of FIG. 3 (Embodiment No. 2) extends upwardly in contrast to the handle 18 of FIG. 2 (Embodiment No. 1) which extends downwardly; also the emergency control shaft 84 is located below the upward handle 37 of FIG. 3 (Embodiment No. 2) in contrast to the emergency control shaft 84 of FIG. 2 being located above the downward handle 18 (Embodiment No. 1).

The operative components of Embodiment No. 2 are the same in several respects to the operative components of Embodiment No. 1, although there is a significant difference as to some of the elements, all as herein described.

It is to be noted that the features of the device as mounted on the inside of the door 10 for Embodiment No. 2 are all the same as those of Embodiment No. 1; and thus the inside of the door 10 features are not re-explained.

Turning now to the description of the device components on the outside of the door 10 of Embodiment No. 2, the elements which are of the prior art elements located on the outside of the door 10 are those of the latching and unlatching features, are all the same as those described for Embodiment No. 1, including the mounting bracket 26 (with exception of additional holes for elements of Embodiment 2), handle head 34, handle head upper corner 34A, handle head lower corner 34B, stop pins 38, driver pin 48 (on all handles), cam 52, latch bolt drive shaft 60, arm 61 of the cam 52, mounting screws 62, mounting holes 64, nuts 66, ears 67, axle rivet 68, and torsion spring 74.

(It should be noted, as observing FIGS. 16 and 18, that the shape of handle head 34 between its ends 34A and 34B is of limited width 106, assuring the clearance of the portion of 34A as it passes the lockbar 56.)

Continuing as to elements which are similar to both embodiments: After a patient or other person enters the bathroom he or she closes the door 10, he or she may then rotate the thumb-turner 20 to achieve locked position. The rod 22 extends through the door 10 and passes through both mounting plates 26 through holes 24. The drive pin 75 (of the outside of the door device) is carried by control rod 22, and extends radially from the control rod 22 for achieving a blocking function (77) similar to the blocking function of the blocking plate 28 (36).

Drive pin 75 is engaged into hole 76 on the lock bar 56, being a control component of the device on the outside of the door 10, whose role and description are detailed below in connection with FIGS. 14–19.

As mentioned above in Embodiment No. 1, when the control rod 22 is rotated-by the thumb-turner 20 counter-clockwise (as viewed from inside the bathroom, see FIG. 4), the drive pin 75 (FIG. 15) which is engaged through hole 76 of lockbar 56, moves the lockbar 56 up to its locked position, by abutting engagement 77 at the outside corner 78 of lockbar 56 as shown in FIG. 16, by the upper corner 34A of handle head 34 on handle 37 from being pushed to unlatch the door 10.

Embodiment No. 2 of the present invention provides, as shown, the great advantage of providing convenient access by the nurse to open the door 10 in spite of the lock as caused by the patient turning the thumbturn 20 to its locked position. As shown best in FIG. 14, there is provided an emergency control shaft 84 having an outer button-shaped head 85, which extends through a hole 86 in the cover 96.

Continuing (FIG. 14) the similarity of Embodiment No. 1, the outer head 85 is shown as an integral enlargement of the shaft 84; and appears as a general button-shape, which when assembled into the cover 96 through the hole 86 would be seen as a face 91 area of the cover 96 (FIG. 3).

The shaft 84 is held against axial movement by a snap ring 88 which fits into a annular groove 89 of the shaft 84 and which abuts against the inwardly facing circular wall 97 of the cover 96 in the region 96A of the hole 86. The shaft 84 is held against axial movement in the other (rightwardly as shown in FIG. 14) directed by the inwardly-direction face 90 of the outer head 85 engaging the outer face 98 of cover 96, or preferably as shown by engaging a counterbore circular wall 99 of the outer face 98 of the cover 96.

Concluding now the showing of the similarity of the illustrative two Embodiments, the emergency control shaft 84 has a slot 93 in depth and width which will receive a screwdriver or a coin, etc., to be inserted into slot 93, for turning emergency control shaft 84 (counter-clockwise in the form shown). A significant factor of the outer head 85 is that the head 85 does not give any likely appearance of being a control element; for it is an advantage that non-authorized persons would not be able to think that [it-is] *it is* a door knob or a control knob providing the emergency control of unlocking ability.

Now showing the diversions of Embodiment No. 2 from Embodiment No. 1, it will be noted that the emergency control shaft 84 is coupled to a secondary control rod 100, in contrast to its coupling to primary control rod 22 of Embodiment 1, and the axis of shaft 84 in Embodiment 2 is displaced from, though parallel to, the axis of the primary control rod 22. This connection of shaft 84 to secondary control rod 100 (now noticing FIG. 14 for Embodiment 2) is shown as by a slot 101 being connected with the tongue 94 on the shaft 84, locking them against relative rotation.

The secondary control rod 100 is mounted through bottom hole 24 of mounting bracket 26 and held thereto by snap ring 102.

Rotating the emergency control shaft 84 (by turning outer head 85 as by a screwdriver, coin, etc.) counter-clockwise, rotates the secondary control rod 100 which has a drive pin 103 attached as a radial arm to the secondary control rod 100; and drive pin 103 is engaged into primary locking bar 56, through its bottom hole 104.

As to locking bar 56 as shown in FIGS. 14–19, and particularly as noticing FIGS. 16 and 18, it is a vertical bar which is shown in FIGS. 14–19 as being in a vertically reversed position from its position in FIGS. 8–13 of Embodiment No. 1; that is, the locking features (blocking engagement 77, corner 78 of locking bar 56, and notch 95) as shown in this Embodiment No. 2 are shown as located in the top region of locking bar 56, and it is the handle head 34A which is the handle head which provides the blocking engagement 77 rather than the handle head 34B of Embodiment No. 1 providing the blocking engagement 77. Providing the locking function, as shown, the parts are the same as specified above as to Embodiment No. 1.

It may be seen that the action of the locking bar 56, as shown in all of those FIGS. 14–19, is caused by the action of the pin 75's engagement of the hole 76 located near the top of locking bar 56, and correspondingly the pin 103's engagement of the hole 104 located near the bottom of locking bar 56, as previously mentioned. As the secondary control rod 100 (or a control rod 84 which is an extension of the secondary control rod 100) is revolved, the pin 103 by its engagement with the locking bar hole 104 moves the locking bar 56 into and between a locking position shown in FIG. 16 and an unlocked position shown in FIG. 18.

Thus the locked and unlocked positions, respectively, are sown in FIGS. 16 and 18, as limited by the two ends of the slot 79 of the locking bar 56 as the screw 80 is abutted by the end of the slot 79 during the movement of pin 103's revolving, and with the receiver hole 104 of locking bar 56 partaking of that motion of pin 103, and the pin 75's revolving as initiated by the actuation of the emergency control shaft 84 and its pin 103, and with the receiver hole 76 partaking of that motion of pin 75 as caused by the rotation of shaft 84.

The effect of the sliding of locking bar 56 in Embodiment No. 2 as shown in FIGS. 16 and 18, is (FIG. 16) that the head 34A of handle head 34 is stopped at blocking location 77 by its engagement with corner 78 of locking bar 56. This is a position of locked travel of the handle 37 against being pushed inwardly, because any attempted movement of the handle 37 toward the door 10, as the handle 37 would be rotating about the axle rivet 68, would be blocked by the engagement of 34A and the corner 78 of locking bar 56.

Unlocked position of the handle 37, as shown as achieved in FIG. 18, is caused by the locking bar having been moved downwardly by the action of pin 103 (and hole 104) and the initiated action of pin 75 (and hole 76) pulling the locking bar 56 to a downward position (FIG. 18) in which the downward travel of the locking bar corner 78 releases the engagement 77 with the upper corner of the handle head 34A. This permits the handle head 34, with its limited width (recess 106, assuring the clearance of the portion of 34A as it passes the lockbar 56), to move inwardly with the blocking interference of engagement 77 having been released, permitting the free movement of the handle 37 during the release effort of the 2nd embodiment.

Similar to Embodiment No. 1, when emergency control shaft 84 (by turning outer head 85) is turned counter-clockwise, as viewed from the outside, this will pull down the primary locking bar 56 to its unlocked position as shown in FIG. 18. A notch 95, as shown, of primary locking bar 56 provides clearance (unlocking effect) together with the limited width (recess 106) of handle head 34 to rotate forward by pushing forward on handle 37. Handle 37 is then free to be pushed forwardly to operate the unlatching mechanism of the prior art which had no locking ability such as this invention provides by the operativity of its locking bar 56 together with blocking plate 28.

The cover 96 for this Embodiment No. 2 is shown similar to that of Embodiment No. 10 to be mounted to mounting bracket 26 through hole 105 by screws 65 through side holes 65A located on the side of the cover 96, except for the location of the bole 86 of cover 96 being located below the handle 37.

X. FURTHER DETAILED DESCRIPTION, AS ESPECIALLY SHOWN IN THE EXPLODED VIEWS OF FIGS. 20–22

FIGS. 20–22, as noted above, are exploded views with the parts shown in their relationship to one another, to the extent which seems desirable in view of the complexity of the case and the multitude of its components; and in all of these views the parts are designated from left to right as shown on the drawings, the explosion indicated for the particular view including those components along the axis which is given the reference 120 which is the axis of the primary control rod 22, and including those along the axis which is given the reference 122 which is the axis of the prior art's latching and unlatching mechanism; and more particularly:

FIG. 20 shows the components of primary control rod 22 which are mounted on the inside of the door and is included in both Embodiments of this invention, as shown by the axis shown as reference number 120, the parts shown as being strung along line 120 being those of the thumbturner 20 (on the upper left corner of the view) through the hole 24 of mounting bracket 26 (on the lower right corner of the view) for continuing on through the door (not shown).

Also in FIG. 20, the part of that axis 120 is shown as broken off between the snap ring 46 and the square end flats 40 of the primary control rod 22, to avoid obscuring of details, which may seem otherwise not as clear, behind other components in this view;

Also in this view, there is axis 122 which contains the components of the prior art's latching and unlatching mechanism, from the hole 73 in cover 45 through the snap ring 70 of latch bolt driveshaft 60;

FIG. 20 also shows the exploded single part of the axial rivet 68 as staked onto mounting bracket ear 67 along its axis 124;

FIG. 21 shows the parts of Embodiment 1 which are (handle 18 down) mounted on the outside of the door, beginning with the axis 120 as the axis of the primary control rod 22 as having been continued through the door from the hole 24 on the mounting bracket 26 of the inside of the door, clear through to the emergency turn button 85 of embodiment 1.

Also shown in FIG. 21 is axis 122 which contains the components shown from latchbolt driveshaft 60 through the hole 73 of cover 87, and also shows the exploded single part of the axial rivet 68 as threaded into the mounting bracket ear 67 along its axis 124; and FIG. 22 shows the parts of embodiment 2 which are (handle 37 up) mounted on the outside of the door. Beginning with the axis 120 as the axis of the primary control rod 22 as having been continued through the door from its location 24 on the mounting bracket 26 of the inside of the door clear through to the top drive pin 75 located on the primary control rod 22 of embodiment 2;

Also shown in FIG. 22 is axis 122 which contains the components of the prior art's latching and unlatching mechanism, from the latchbolt driveshaft 60 through hole 73 of cover 96; and also shows the exploded single part of the axial rivet 68 as staked onto the mounting bracket ear 67 along its axis 124; and Also shown in FIG. 22 of embodiment 2, is the axis 126 for the secondary control rod 100 as it is mounted through bottom hole 24 of mounting bracket 26 and held thereto by snap ring 102 through to the emergency turn button 85 of embodiment 2.

XI. SUMMARY

The invention as described herein provides a desired combination of concepts and features, considered both as particular concepts and as concepts in their combinations; and the merits of difference from the prior art has been shown expressly in the text and in the drawings.

Modifications and variations may be effected without departing from the scope of the novel concepts and their invention; accordingly, the invention is not limited to the specific embodiment, or form or arrangement of parts herein described or shown. For example, although the word "manual" can be interpreted to mean an effort by only a person's hands, the term "manual" is used herein in a broader sense,such as the person on either side of the door using his or her hands, arms, elbow, hips, or other anatomy part, or whatever it is which is used to touch the door, with a pushing or pulling effort as presented.

Also, for convenience, the word "nurse" is used to indicate the person on the outside of the door, and the word "patient" is used to refer to the person who is inside the room and in jeopardy of a locked-in condition.

Also, the word "latch" as used herein, refers to the component array included in the overall structure on each side of the door, and thus, more precisely, the word "latch" is used in a sense of a latchbolt retriever, and the mechanism by which the latchbolt retriever is made to serve as a latch which releasably holds the door in a conventional "shut" position, but also serves as a lock which is releasable by a person standing on either side of the door.

XII. CONCLUSION

It is thus seen that a door-control apparatus constructed and used according to the inventive concepts herein set forth, provides novel concepts of desirable and advantageous devices, yielding the advantages of achievement by which a door or panel may have a push/pull operativity which is lock-controlable from both sides of the door panel. The device provides the advantages herein indicated, and provides means by which the advantageous push/pull mechanism may be achieved for full privacy to a locked room, yet an emergency access to the locked room by a person standing outside the door.

And even though push/pull door-controls of the prior art have been known for many years, no prior art has suggested the particulars of modifications of any other prior art to achieve specific novel concepts here achieved.

I claim:

1. A locking means including a retractable latchbolt means, for providing particular locking and unlocking characteristics for a movable panel, the movable panel having first and second faces opposite one another, and being movable into and between a first panel position and a second panel position, and the movable panel being supported by an associated rigid structure;

the rigid structure providing support for the movable panel in its movement into and between said positions; and the rigid structure also providing for the locking means a retainer means for providing releasable retention co-operation with the retractable latchbolt means, the latchbolt means providing a releasable latching and releasable locking in said co-operation with the retainer means, the latchbolt means being carried by the panel for providing a panel-maintaining of the panel in its first panel-position in which position the panel is restricted against movement which would move the panel toward the second panel-position when the latchbolt means is retracted from retention by the retainer means, and the latchbolt means being movable into and between an extended position in which it provides said panel-maintaining, and a retracted position in which it permits such panel movement;

the locking means also comprising, in combination:

a first latch device *adapted to be* carried on the first face of the panel, and a second latch device *adapted to be* carried on the second face of the panel, each of the latch devices having *a latch-releasing linkage including* an actuator means which is rotationally movable about an axis parallel to the plane of the panel, and in a plane perpendicular to the plane of the panel,

[the first latch device] *each latch-releasing linkage* having a force-transmission means, [and the second latch device having a force-transmission means.]

each of the force-transmission means[, independently of one another,] being operable in response to movement of its respective actuator means to move in a plane perpendicular to the plane of the panel[-], and in so moving, to move the latchbolt means to its retracted position to permit the panel to move to its second panel-position, each latch [device]-*releasing linkage* having in its force-transmission means one or more controllable components which are controlled in response to the movement of its respective actuator means, a lock for the latch device of at least [a] *the* first [one] of the panel faces [comprisings] *comprising*:

(a) at least one movable manual control member, (b) support means for supporting the control member for its movement, (c) the control member being provided with at least one abutment member which is operable, in accordance with the control member's movement, to move to a position of operative abutment-encounter of [the actuator means] *a member of the latch-releasing linkage* and the abutment member, in which the abutment member imposes a blocking force against the [actuator means] *member of the latch-releasing linkage*[, the abutment member being supported so as to have a plane of movement in its movement into and from its position of operative encounter with the actuator means, which plane is perpendicular to the plane of movement of the actuator means, in its movement for causing withdrawal of the latchbolt from its panel-maintaining extended position, the abbutting encounter being operable to prevent the actuator means from any engagement of the force-transmission means to an extent which would enable the actuator means and the force-transmission means to achieve latchbolt means withdrawal by the action of the force-transmission means in response to the movement of the actuator means and the force-transmission means]; *and*

*means for achieving a locking of the second latch device's actuator means.*

[2. The locking means as set forth in claim 1, with means for achieving a locking of the other second latch device's actuator means.]

3. The locking means as set forth in claim [2] *1*, in which each latch device is engageable by said lock [each which is], *the lock being* manually operable to effect a locking engagement of *the* actuator means with said *at least one* abutment [members] *member,* [by] the lock preventing [the] *any* movement of the actuator means sufficient to [each] achieve latchbolt means withdrawal.

4. The locking means as set forth in claim 3, [in which one said] *further comprising a* manual control member [of] *for* the second latch device *which* is able to release the lock, even though the manual control member of said first latch device has established a locked condition of abutment encounter of the said abutment member and the actuator means.

5. The locking means as set forth in claim 3, in which the control member [operatively extends] *is adapted to operatively extend* through the panel and through covers provided as housings for the latch device, [providing] *and the control member further comprises* manually operable means sufficiently to accept manual operable manipulation to achieve [the] locking and unlocking.

6. The locking means as set forth in claim 1, in which the said abutment member moves about 45 degrees from [its] *a* position of locking engagement with the [actuator means] *latch-releasing linkage*, to a withdrawn condition in which it is fully released from abutment with the [actuator means] *latch-releasing linkage*.

7. The locking means as set forth in claim 1, in which the control member for at least one of the latch [devices is provided to be]-*releasing linkages comprises* an inconspicuous movable body member.

*8. The locking means as set forth in claim 1, in which the member of the latch-releasing linkage on which the blocking force is applied by the abutment member comprises the actuator means.*

*9. The locking means as set forth in claim 1, further comprising a support for the abutment member, the support providing a plane of movement for the abutment member which is perpendicular to the plane of movement of the actuator means.*

*10. A lock for a door having two faces and being moveably in a frame between an open and a closed position, the lock including a latchbolt, the frame supporting the door and including a latchhole to receive the latchbolt, the latchbolt being moveable between an extended position holding the door closed when in the latchhole and a retracted position permitting the door to open when withdrawn from the latchhole, the lock also comprising:*

*a latch-releasing linkage including a first handle adapted to be carried by a first of the two door faces and second handle adapted to be carried by a second of the two door faces, each of the handles being constrained to rotate about an axis parallel to the plane of the door, and a series of components coupled to each of the*

*handles for transmitting a force from each of the handles to said latchbolt to retract the latchbolt,*

*a control for preventing retraction of the latchbolt by at least one of the handles including:*

*(a) a movable control rod,*

*(b) a support for the control rod to allow manual movement of the rod, and*

*(c) a blocking element coupled to the control rod which can be positioned by movement of the rod to encounter at least one component of the latch-releasing linkage for preventing movement of the latch-releasing linkage sufficient to prevent retraction of the latchbolt; and*

*means for achieving a locking of the second handle.*

*11. A lock as claimed in claim 10 wherein each of the handles includes a head forming a first of said series of components, the blocking element being positionable to encounter the head of one of the handles to prevent movement thereof.*

*12. A lock as claimed in claim 10 wherein the blocking element includes two block elements coupled to the control rod, each block element operating separately to prevent latchbolt retraction by one of the handles.*

*13. A lock as claimed in claim 10 wherein the blocking element comprises an arm radially extending from the control rod, the arm having a surface for encountering a member of the latch-releasing linkage.*

*14. A lock as claimed in claim 13 in which the blocking element moves about 45° between an encountering position preventing movement of one member of the latch-releasing linkage and a non-encountering position allowing the latchbolt to be retracted.*

*15. A lock as claimed in claim 10 wherein the blocking element comprises a bar constrained to move linearly in response to movement of the control rod, the blocking element having a surface for encountering a member of the latch-releasing linkage.*

*16. A lock as claimed in claim 10 further comprising a knob coupled to one end of the control rod to facilitate manual movement of the control rod.*

*17. A lock as claimed in claim 16 in which the control rod is adapted to extend through the door and includes an inconspicuous feature located on the side of the door opposite the knob which permits the latchbolt to be retracted from both sides of the door.*

*18. A lock as claimed in claim 10 wherein the blocking element comprises a bar constrained to move linearly in response to movement of the control rod, the blocking element having a surface for encountering one member of one of said latch-releasing linkages.*

*19. A lock as claimed in claim 10 further comprising a support for the blocking element permitting movement of the blocking element only within a plane perpendicular to the plane of movement of at least one handle.*

*20. A lock as claimed in claim 10 wherein at least one of the handles includes a head carrying at least one stop pin, the blocking element being positionable to encounter the stop pin to prevent movement of the latch-releasing linkages.*

* * * * *